Feb. 23, 1926.                         1,574,462
J. A. WINTROATH
ONE-WAY COUPLING
Filed June 25, 1923
Fig.1.
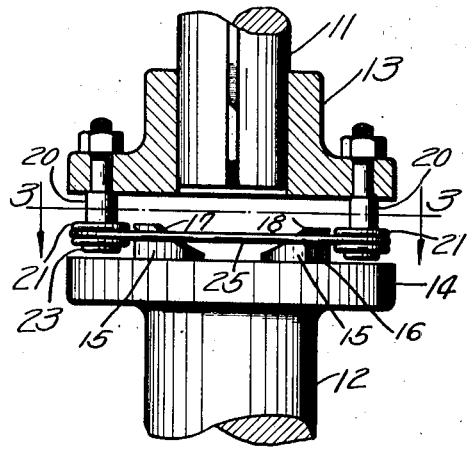
Fig.2.
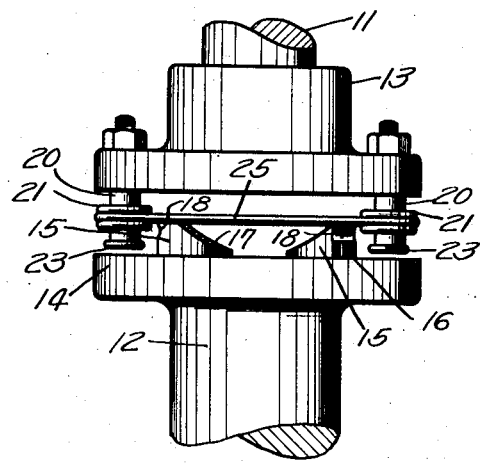
Fig.3.
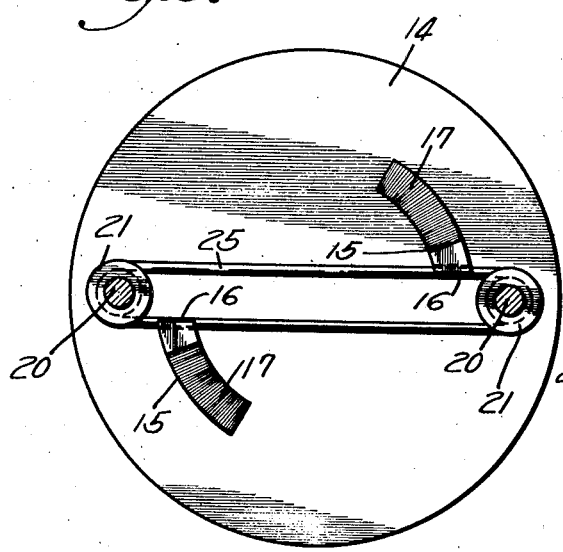
Fig.4.
Fig.5.
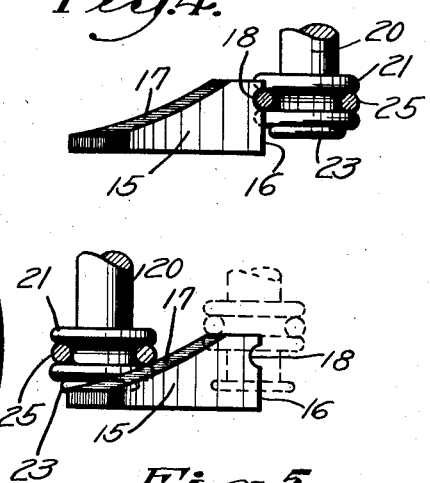
INVENTOR
JOHN A. WINTROATH
BY
ATTORNEYS Patented Feb. 23, 1926.

1,574,462

UNITED STATES PATENT OFFICE.

JOHN A. WINTROATH, OF LOS ANGELES, CALIFORNIA, ASSIGNOR TO PEERLESS PUMP COMPANY, A CORPORATION OF CALIFORNIA.

ONE-WAY COUPLING.

Application filed June 25, 1923. Serial No. 647,604.

*To all whom it may concern:*

Be it known that I, JOHN A. WINTROATH, a citizen of the United States, residing at Los Angeles, in the county of Los Angeles, State of California, have invented a new and useful One-Way Coupling, of which the following is a specification.

My invention relates to the art of coupling machinery and is particularly applicable to the coupling of polyphase alternating current electric motors to turbine pumps.

It is common practice throughout the country to operate pumps having a vertical shaft to which is coupled an electric motor. These electric motors are commonly three phase, alternating current motors, and their direction of rotation is quickly changed by a transposition of two of the three supply wires. These transpositions are sometimes accidentally made in changing line connections, in which event the motor tends to run in a reverse direction. The running of such a motor in a reverse direction is extremely likely to injure the pump, and it is desirable to include in every pump of this nature a means for preventing the pump from being driven in any but the proper direction, which is hereinafter called a positive direction.

It is an object of my invention to provide a mechanical means or coupling for connecting the shaft of the motor to the shaft of the pump in such a manner that the motor will not drive the pump in a negative direction.

It is a further object of the invention to provide a coupling of this character which will be so constructed that it will provide some flexibility between the motor shaft and the pump shaft.

Further objects and advantages will be made evident hereinafter.

Referring to the drawing which is for illustrative purposes only,

Fig. 1 is a side elevation partly in section, showing my invention with the parts in the position they occupy when the pump is being driven in a positive direction.

Fig. 2 is a similar view showing the parts in the position they occupy with the motor rotator revolving in a negative direction.

Fig. 3 is a section taken on a plane represented by the line 3—3 of Fig. 1.

Figs. 4 and 5 are details.

In the form of my invention illustrated in these drawings, 11 is the shaft of a motor and 12 is the shaft of a pump, the motor shaft being hereinafter sometimes referred to as the driving shaft and the pump shaft 12 being hereinafter sometimes referred to as the driven shaft. Secured to the shaft 11 is a driving flange 13 and formed on the shaft 12 is a driven flange 14. Projecting upwardly from the driven flange 14 are two projections or lugs 15. These lugs are diametrically opposite each other with relation to the axes of the shafts 11 and 12, and have a straight face 16 and a sloping back 17, as shown in Figs. 4 and 5. The faces 16 may be provided with notches 18. Projecting downwardly from the driving flange 13 are pins 20, which are diametrically opposite each other with relation to the axes of the shafts 11 and 12, and which are so situated that they can revolve without striking the lugs or projections 15.

Mounted on each of the pins 20 is a spool 21 which is loosely fitted on the pin and free to slide axially thereon. The two spools 21 are connected by a flexible steel member 25, which extends around both of the spools, as shown in Fig. 3. The pins 20 are provided with heads 23 which are so placed that when the spools are in their lower position, the member 25 lies in grooves 18 of the lugs 15. The member 25 is preferably made of spring steel and is tempered to be quite resilient so that when engaged by one of the lugs in advance of engagement thereof by the opposite lugs, it will yield circularly to a slight extent until both lugs are engaged, thus providing a connection which is fully efficient, even though the coupling members are not directly aligned and even though the opposite lugs are not in true diametric alignment through wear or through initially inaccurate workmanship. This provides a circularly yieldable coupling compensating for slight variations due to inaccurate workmanship or to wear, or due to disalignment of the main coupling members.

The method of operation of my invention is as follows:

With the parts in the position shown in Figs. 1, 3 and 4, the shaft 11 being driven in a positive direction, that is in a counter clockwise direction as viewed in Fig. 3, the member 25 engages the grooves 18 and drives the shaft 12 through the lugs 15. The member 25 is sufficiently resilient to provide for contact at both of the lugs 15, and the coupling being a loose one, it is possible for the apparatus to operate even if the shafts 11 and 12 are considerably out of alignment. Whenever the motor rotary shaft 11 starts to rotate in a negative direction, the member 25 leaves the grooves 18 of both of the lugs 15, and after turning for something less than 180° the inclined surfaces 17 of the lugs pass under the member 25, the member being lifted as shown in Fig. 5. The spools 21 slide freely on the pins 20 and the parts assume the position shown in Fig. 2. The member 25 passes freely over the lugs 15 and the shaft 11 rotates without turning the shaft 12. When the upper flange 13 is again rotated in positive direction, the spools 21 drop down on the pins 20 so that the member 25 is again brought into a position wherein it will engage the lugs or projections 15 in the proper driving manner.

I claim as my invention:

1. The combination of: a driving shaft; a driven shaft; projection secured to one of said shaft; pins secured to the other of said shafts and extending longitudinally thereof; and a member slidably supported on said pins, said member being adapted to engage said projections in a manner causing said driven shaft to be rotated when said driving shaft is rotated in a positive direction, and to be slid on said pins by said projections when said driving shaft is rotated in a negative direction, said member being circularly yieldable until all of said projections have equal driving contact therewith in a driving rotation.

2. The combination of: a driving shaft; a driven shaft; projections secured to one of said shafts; pins secured to the other of said shafts and extending longitudinally thereof; and a flexible member slidably supported on said pins, said member being adapted to engage said projections in a manner causing said driven shaft to be rotated when said driving shaft is rotated in a positive direction, said member being adapted to be slid on said pins by said projections when said driving shaft is rotated in a negative direction.

3. The combination of: a driving shaft; a driven shaft; projections secured to one of said shafts; pins secured to the other of said shafts, one for each of said projections; a spool slidably mounted on each of said pins; and a looped member mounted on said spools, said looped member being adapted to engage said projections in a manner causing said driven shaft to be rotated when said driving shaft is rotated in a positive direction and to be slid by said projections when said driving shaft is rotated in a negative direction.

4. A one way coupling which comprises: opposing members rotatable in substantially aligned axial planes; and an intermediate one way ratchet connecting mechanism, said mechanism consisting of oppositely disposed lugs secured to one of said members and each formed to provide a longitudinal abutment face and an inclined face extending circumferentially therefrom, and means carried by the other of said members and slidable axially to ratchet over said lugs when rotated in a negative direction and to have a driving engagement therewith when rotated in a positive direction, said means being yieldable circularly to compensate for inaccuracies due to wear or faulty alignment of parts.

5. A one way coupling which comprises: opposing members rotatable in substantially aligned axial planes; and an intermediate one way ratchet connecting mechanism, said mechanism consisting of oppositely disposed lugs secured to one of said members and each formed to provide a longitudinal abutment face and an inclined face extending circumferentially therefrom, and means carried by the other of said members and slidable axially to ratchet over said lugs when rotated in a negative direction and to have a driving engagement therewith when rotated in a positive direction, said means comprising a flexible member diametrically disposed and adapted to be engaged at different points by said lugs and yieldable circularly until both of said lugs have found driving contact therewith during a driving rotation.

6. A one way coupling which comprises: a driving shaft; a driven shaft; a driving flange on said driving shaft; a driven flange on said driven shaft, said shafts being substantially in vertical axial alignment and said flanges being adjacent to each other; a pair of projections on the lower flange, said projections having axial faces substantially parallel to a common plane passing through the axis of said shafts and inclined faces extending circumferentially from said axial faces, said projections being diametrically opposite each other with reference to said axis and between said flanges; a pair of pins diametrically opposed to each other with reference to said axis, said pins projecting downwardly from the upper flange into the space between said flanges; spools sliding on said pins; and a member connecting said spools and so mounted as to drop down and engage said projections when said driving shaft is rotated in a positive direction, said members being pushed out of the path of said projections when said driving shaft is rotated in a negative direction.

7. A one way coupling which comprises: a driving shaft; a driven shaft; a driving flange on said driving shaft; a driven flange on said driven shaft, said shafts being substantially in vertical axial alignment and said flanges being adjacent to each other; a pair of projections on the lower flange, said projections having axial faces substantially parallel to a common plane passing through the axis of said shafts and inclined faces extending circumferentially from said axial faces, said projections being diametrically opposite each other with reference to said axis and between said flanges; a pair of pins diametrically opposed to each other with reference to said axis, said pins projecting downwardly from the upper flange into the space between said flanges; spools sliding on said pins; and a flexible member connecting said spools and so mounted as to drop down and engage said projections when said driving shaft is rotated in a positive direction, said members being pushed out of the path of said projections when said driving shaft is rotated in a negative direction.

8. A one way coupling which comprises: a driving shaft; a driven shaft; a driving flange on said driving shaft; a driven flange on said driven shaft, said shafts being substantially in vertical axial alignment and said flanges being adjacent to each other; a pair of projections on the lower flange, said projections having axial faces substantially parallel to a common plane passing through the axis of said shafts and inclined faces extending circumferentially from said axial faces, said projections being diametrically opposite each other with reference to said axis and between said flanges; a pair of pins diametrically opposed to each other with reference to said axis, said pins projecting downwardly from the upper flange into the space between said flanges; spools sliding on said pins; and a flexible loop of wire passing around said spools and so mounted as to drop down and engage said projections when said driving shaft is rotated in a positive direction, said members being pushed out of the path of said projections when said driving shaft is rotated in a negative direction.

9. The combination of: a driving shaft; a driven shaft; projections secured to one of said shafts; pins secured to the other of said shafts, one for each of said projections; a spool slidably mounted on each of said pins; and a flexible looped member mounted on said spools, said looped member being adapted to engage said projections in a manner causing said driven shaft to be rotated when said driving shaft is rotated in a positive direction and to be slid by said projections when said driving shaft is rotated in a negative direction.

In testimony whereof, I have hereunto set my hand at Los Angeles, California, this 19th day of June, 1923.

JOHN A. WINTROATH.